United States Patent Office 3,238,013
Patented Mar. 1, 1966

3,238,013
PRODUCTION OF NITROGENOUS COMPOUNDS CONTAINING HALOGENS
Mervin D. Marshall, Fombell, and William H. Bernauer, Butler, Pa., assignors to Callery Chemical Company, Pittsburgh, Pa., a corporation of Pennsylvania
No Drawing. Filed Apr. 26, 1962, Ser. No. 191,398
10 Claims. (Cl. 23—14)

This application is a continuation-in-part of our copending application, Serial No. 41,436, filed July 7, 1960, now abandoned.

This invention relates to the production of certain compounds containing halogens and nitrogen, and more particularly to the production of halodifluoramines and dinitrogen tetrafluoride.

Halodifluoramines and dinitrogen tetrafluoride are compounds in which the halogen atoms are bonded to nitrogen. These compounds are quite reactive and serve as oxidizing agents and as intermediates for introducing the $-NF_2$ group into other compounds. Dinitrogen tetrafluoride has the formula $N_2F_4$ and can be used as an oxidizer in conjunction with conventional rocket fuels. For example, it is used with hydrazine in rocket engines in the same manner as the conventional oxidizing agent, $ClF_3$. Furthermore, its addition to olefins is being widely investigated for solid fuel binder applications.

Halodifluoramines, such as chlorodifluoramine, $ClNF_2$, are also reactive compounds which have been used as intermediates in the prepartion of other compounds containing the $NF_2$ group. For example, chlorodifluoramine can be reacted with ethylene to produce 1-chloro-2-difluoraminoethane. Moreover, halodifluoramines, such as bromodifluoramine, are useful as additives in conjunction with hydrogen peroxide or other such known oxidizers to make an oxidizing mixture having desirable properties in rocket applications. Such mixtures are used in the same engines and in the same manner as the original oxidizer itself would be used.

Broadly stated, the process of our invention comprises the reaction of difluoramine, $HNF_2$, with a solution containing hypohalous acid, HOX, and the hypohalite ion, $OX^-$, where X is chlorine or bromine. This reaction results in a mixture of halodifluoramine and dinitrogen tetrafluoride as products; these compounds can, if desired, be separated by ordinary methods such as fractional distillation or condensation.

Hypohalous acid and hypohalite ion exist as an equilibrium mixture in aqueous solutions according to the following equation in which chlorine is illustrated as the halogen:

$$HOCl \rightleftharpoons H^+ + OCl^- \qquad (1)$$

The degree of dissociation is governed by the pH of the solution. In acidic solutions the hypohalous acid predominates and in strongly basic solutions the acid is substantially dissociated into the hypohalite ion. In view of this equilibrium reaction, in any solution in which one species is present the other must necessarily exist in relative concentrations which is governed by the pH of the solution.

The product distribution resulting from this invention is primarily governed by the nature of the equilibrium mixture present in the solution and therefore by the pH of the solution. Thus, although dinitrogen tetrafluoride and the halodifluoramine are both produced to some extent whatever the pH of the solution, solutions having a high pH, i.e., over about 9, result in higher yields of dinitrogen tetrafluoride. On the other hand, solutions having a pH lower than about 9, result in higher yields of halodifluoramine. Solutions having very high pH produce predominately dinitrogen tetrafluoride and only a very small amount of halodifluoramine, while those with very low pH produce very little dinitrogen tetrafluoride and almost exclusixely halodifluoramine.

The reaction solution containing the hypohalous acid and hypohalite ion can be produced in several ways, with the actual method being selected to produce a predominance of the desired reacting species. The following described methods of forming reaction solutions are merely illustrative and in no sense are they intended to restrict the scope of our invention, since any solution of hypohalous acid and/or hypohalite ion is useful in our invention regardless of how obtained.

REACTION SOLUTIONS

Method 1

(a) A metal hypohalite is dissolved in an ionizing solvent:

$$NaOCl \xrightarrow{H_2O} Na^+ + OCl^- \qquad (2)$$

(b) The highly ionized metal hypohalite is directly produced in an ionizing solvent by introducing the halogen into a solution of a strongly basic metal hydroxide in an ionizing solvent:

$$Cl_2 + 2Na^+OH^- \xrightarrow{H_2O} NaCl + Na^+ + OCl^- + H_2O \qquad (3)$$

In each instance a solution of equal molar amounts of metal ion and hypohalite ion is produced. This hypohalite ion enters into an equilibrium reaction to produce a minor amount of hypohalous acid in solution:

$$OCl^- + H_2O \rightleftharpoons HOCl + OH^- \qquad (4)$$

Method 2

The solution of Method 1 is treated with the corresponding halogen:

$$Cl_2 + Na^+OCl^- + H_2O \rightarrow NaCl + 2HOCl \qquad (5)$$

The overall reaction as applied to Method -(b) is:

$$Cl_2 + Na^+OH^- \xrightarrow{H_2O} Na^+Cl^- + HOCl \qquad (6)$$

The hypohalous acid produced by this method will form an equilibrium mixture according to Equation 1.

Method 3

Chlorine or bromine is dissolved in an ionizing solvent:

$$Cl_2 + H_2O \rightleftharpoons HOCl + H^+Cl^- \qquad (7)$$

It is preferred that a weak base capable of reacting with the strong acid HX but substantially non-reactive with the weak acid HOX, where X is the halogen being introduced, be used:

$$2Cl_2 + H_2O + HgO \xrightarrow{H_2O} 2HOCl + HgCl_2\downarrow \qquad (8)$$

This in effect forces the equilibrium to the right by eliminating the strong halogen acid formed according to reaction (7) thereby increasing the concentration of hypohalous acid. It also removes free halogen which enters into side reactions favoring $N_2F_4$ production.

Method 1 tends to produce solutions of relatively high pH and thus favors the production of dinitrogen tetrafluoride whereas Methods 2 and 3 tend to produce solutions of relatively low pH and therefore result in proportionately higher yields of the halodifluoramine.

Each of the methods utilizes an ionizing solvent as the reaction medium. While any ionizing solvent can be used as the medium for the reaction, water is by far the cheapest and most readily available such solvent and it is most satisfactory for use in our process. Therefore, we have generally used water in practicing our invention.

In preparing solutions by Method 1(a) above, any stable metal hypohalite can be employed as a reactant in our invention. Such compounds include, for example, sodium hypochlorite, potassium hypobromite, calcium hypochlorite, lithium hypochlorite, and barium hypochlorite dihydrate. Sodium hypochlorite is the cheapest and most readily available hypohalite as well as one of the most stable, so that we prefer to use it in carrying out the process.

The overall concentration of the hypohalous acid and hypohalite ion in the solution is not critical to operability of the process. Any concentration in which the hypohalite ion is stable in solution can be used. Concentrations of about 5% have been generally used in demonstrating our invention and have been found to be quite satisfactory.

The following examples demonstrate the production of dinitrogen tetrafluoride and halodifluoramines according to our invention:

Example 1.—Sodium hypochlorite was formed by the reaction of sodium hydroxide and chlorine at 0° C. No attempt was made to control pH. A total of 1.77 millimols of difluoramine was bubbled through this aqueous solution of sodium hypochlorite. The mixture was stirred for about 15 minutes at room temperature, about 25° C., after which the volatile products were removed and fractionally distilled. The lowest boiling fraction was analyzed and found to consist of 0.36 millimol of dinitrogen tetrafluoride and 0.72 millimol of chlorodifluoramine.

We have found that by adjusting the amount of halogen that is introduced into the solution we can control the pH of the solution, and thereby the equilibrium reaction according to Equation 1 and direct the ultimate reaction of our invention to the desired product.

Example 2.—Difluoramine was bubbled through a column of sodium hypohalite solution of pH 11 which had been formed by passing chlorine through a solution of sodium hydroxide. The volatile products of the reaction were analyzed and it was found that dinitrogen tetrafluoride was produced in almost quantitative yields based on the difluoramine added, and that only a very small amount of chlorodifluoramine had been produced. The solution was then treated with additional chlorine until the pH had been reduced to about 6; at this point more difluoramine was added to the solution in the same manner and the volatile products obtained were again analyzed. It was found that chlorodifluoramine was formed almost exclusively and that dinitrogen tetrafluoride was produced in very small or trace amounts.

As shown in the above example, when the pH of the solution is properly controlled either of the products can be produced almost to the exclusion of the other. In this test and other similar tests, it has been found that varying the pH can result in mixtures containing substantial amounts of both products or in product recoveries which are almost quantitative with respect to the desired product. Table I below lists the results of several of these tests which demonstrate the facility with which a desired product composition can be achieved.

TABLE I

| pH | Approximate Product Distribution | |
|---|---|---|
| | Percent $ClNF_2$ | Percent $N_2F_4$ |
| 6 | 99+ | Trace |
| 8 | 80 | 20 |
| 10 | 25 | 75 |
| 12 | Trace | 99+ |

Example 3.—Two substantially identical solutions of sodium hypochlorite in water were prepared. Gaseous difluoramine was bubbled through a column containing one of these solutions and the effluent gases were immediately recovered and analyzed. It was found that 96% of the product consisted of chlorodifluoramine.

Difluoramine was introduced as a gas above the other solution in a glass pot with stirring. The gaseous products were removed and analyzed after the reaction time had been completed. It was found in this example that about one third of the product consisted of dinitrogen tetrafluoride, with the remainder being chlorodifluoramine. Thus it was shown that carrying out the reaction in a flow reactor in which the difluoramine is passed through the hypochlorite solution results in substantially higher yields of chlorodifluoramine than when the difluoramine and products are intermixed during reaction. The reason for this is not clearly understood, however, it is believed to be the result of competing reactions which are minimized in the flow system of reaction. For this reason a flow type of reaction is preferred when relatively pure halodifluoramine is the desired product and also when a continuous reaction is desired by continuously supplying the reaction solution and difluoramine to the reaction unit.

Solutions containing the hypohalite ion are also produced by introducing chlorine or bromine into an ionizing solvent but better yields are obtained if a compound which reacts with HX but is nonreactive with HOX is used according to Method 3. Such compounds include, for example, mercuric oxide, silver oxide and other similarly acting weak bases. The examples which follow demonstrate the practice of the invention in the embodiment set forth as Method 3.

Example 4.—An excess of bromine was placed in water, resulting in a slightly acidic solution. A 21 millimol sample of difluoramine, $HNF_2$, was bubbled slowly through the solution and the effluent gases were passed through cold traps in which they were collected. The products were analyzed by mass spectrometer analysis and it was found that a 30% yield of $BrNF_2$ was obtained, and that the remaining difluoramine was converted to $N_2F_4$. $BrNF_2$ was further identified by infra-red analysis.

Example 5.—A similar solution to that used in Example 4 was used in this example except that mercuric oxide was added, thus displacing the equilibrium and increasing the HOBr concentration. Difluoramine was then passed through this solution in the manner set forth above. It was found that 94.2% yield of $BrNF_2$ was obtained.

Example 6.—Excess chlorine was passed through water and 2.1 grams of mercuric oxide were added to the resulting solution. A 2.63 millimol sample of $HNF_2$ was then passed through the solution at 0° C. producing 2.6 millimols of high purity $ClNF_2$, a 99% yield.

As indicated above, when such weakly basic compounds are used according to Method 3 yields of halodifluoramines are almost quantitative with only very small amounts of dinitrogen tetrafluoride being produced.

According to the provisions of the patent statutes, we have explained the principle and mode of practicing our invention and have described what we now consider to be its best embodiments. However, we desire to have it understood that, within the scope of the appended claims, the invention may be practiced otherwise than as specifically described.

We claim:

1. A method of producing dinitrogen tetrafluoride and halodifluoramine of the formula $XNF_2$ which comprises reacting difluoramine with a solution containing an equilibrium mixture of hypohalous acid of the formula HOX and hypohalite ion of the formula $OX^-$, where X in each instance is selected from the group consisting of chlorine and bromine, and recovering the dinitrogen tetrafluoride and halodifluoramine thereby produced.

2. A method in accordance with claim 1 in which X is chlorine and the said halodifluoramine is chlorodifluoramine.

3. A method in accordance with claim 1 in which X is bromine and the said halodifluoramine is bromodifluoramine.

4. A method in accordance with claim 1 in which said solution has a pH greater than about 9 and the product is predominantly dinitrogen tetrafluoride.

5. A method in accordance with claim 4 in which X is chlorine and the halodifluoramine is chlorodifluoramine.

6. A method in accordance with claim 4 in which X is bromine and the halodifluoramine is bromodifluoramine.

7. A method of producing halodifluoramines of the formula $XNF_2$ which comprises reacting difluoramine with hypohalous acid of the formula HOX in solution, where X in each instance is selected from the group consisting of chlorine and bromine, and recovering the halodifluoramine thereby produced.

8. A method in accordance with claim 7 in which the difluoramine is passed through said solution and said solution has a pH lower than about 9.

9. A method in accordance with claim 8 in which X is chlorine and said halodifluoramine is chlorodifluoramine.

10. A method in accordance with claim 8 in which X is bromine and said halodifluoramine is bromodifluoramine.

References Cited by the Examiner
UNITED STATES PATENTS

| | | | |
|---|---|---|---|
| 3,077,377 | 2/1963 | Lawton et al. | 23—14 |
| 3,134,638 | 5/1964 | Lawton et al. | 23—14 |

OTHER REFERENCES

Maslov: Zhur. Fiz. Khim., vol. 25 (1961), p. 975.

BENJAMIN HENKIN, *Primary Examiner.*

CARL D. QUARFORTH, REUBEN EPSTEIN,
*Examiners.*

UNITED STATES PATENT OFFICE
CERTIFICATE OF CORRECTION

Patent No. 3,238,013                          March 1, 1966

Mervin D. Marshall et al.

It is hereby certified that error appears in the above numbered patent requiring correction and that the said Letters Patent should read as corrected below.

Column 2, line 36, for "$Cl_2 + Na^+OCl + H_2O \rightarrow NaCl + 2HOCl$" read -- $Cl_2 + Na^+OCl^- + H_2O \rightarrow NaCl + 2HOCl$ --; line 37, for "Method-(b)" read -- Method 1(b) --.

Signed and sealed this 1st day of August 1967.

(SEAL)
Attest:

Edward M. Fletcher, Jr.                          EDWARD J. BRENNER
Attesting Officer                                 Commissioner of Patents